UNITED STATES PATENT OFFICE.

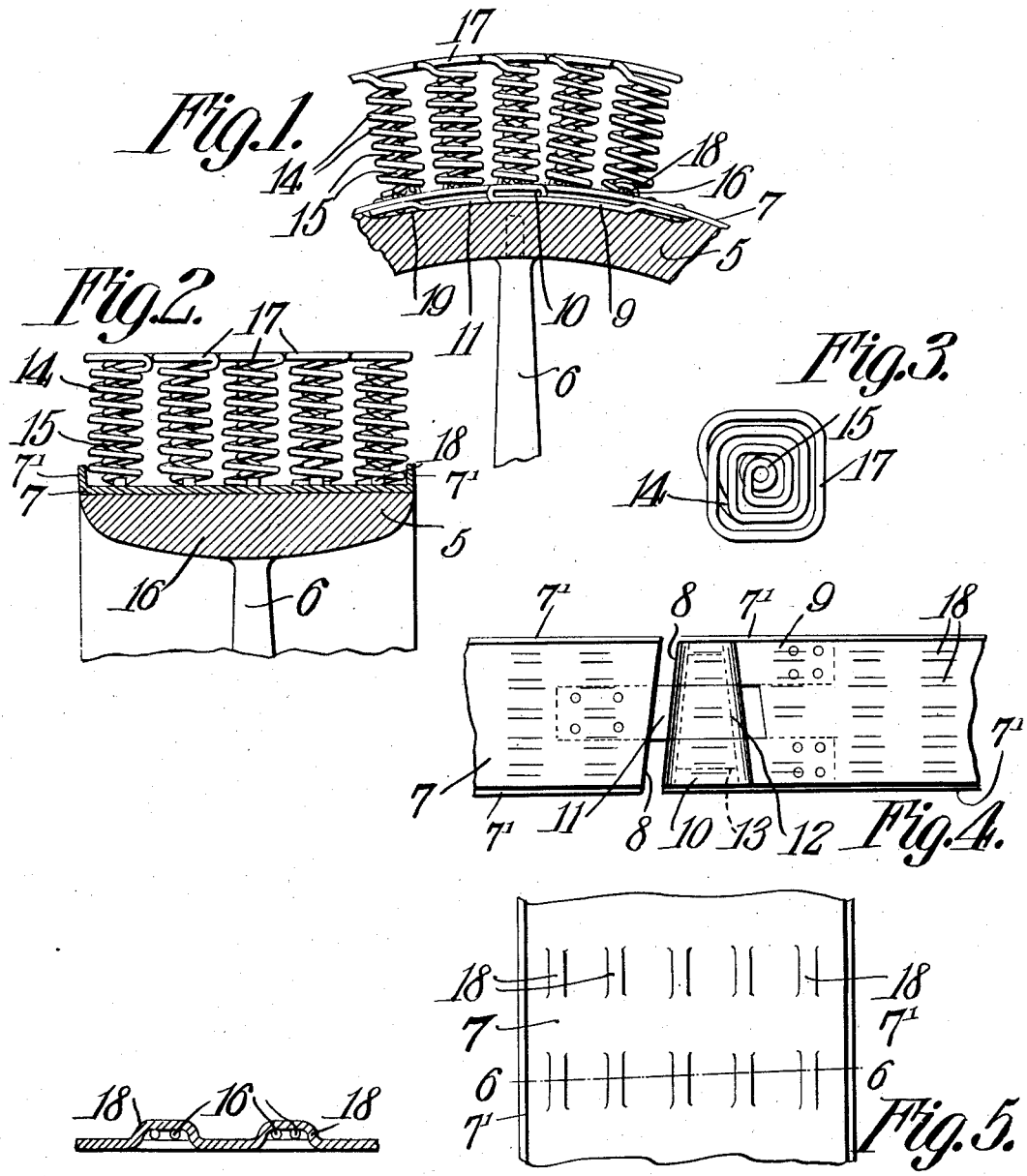

GILBERT O. MAULSBY, OF BIRMINGHAM, ALABAMA.

CUSHION-TIRE FOR VEHICLE-WHEELS.

No. 905,730.          Specification of Letters Patent.          Patented Dec. 1, 1908.

Application filed October 1, 1907. Serial No. 395,420.

*To all whom it may concern:*

Be it known that I, GILBERT O. MAULSBY, a citizen of the United States, residing at Birmingham, in the county of Jefferson and State of Alabama, have invented a new and useful Cushion-Tire for Vehicle-Wheels, of which the following is a specification.

This invention relates to cushion tires for carriages, wagons, bicycles, automobiles and similar vehicles and has for its object to provide a strong, durable and thoroughly efficient tire of this character having a yieldable tread surface for contact with the ground.

A further object of the invention is to provide a tire including a rim adapted to engage the felly of the wheel and having a plurality of coiled springs secured thereto with their outer ends suitably united so as to receive and absorb any jar or impact incident to traveling over rough or uneven roads.

A further object is to provide improved means for clamping the tire in position on the felly of the wheel, and means for securing the yieldable members or springs in position on the rim.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a longitudinal sectional view of a portion of a wheel provided with a cushion tire constructed in accordance with my invention. Fig. 2 is a transverse sectional view of the same. Fig. 3 is a top plan view of one of the yieldable members or springs detached. Fig. 4 is a similar view of the adjacent ends of the tire rim showing the manner of uniting the same. Fig. 5 is an enlarged view of a portion of the rim showing the loops for the reception of the adjacent ends of the coiled springs. Fig. 6 is a transverse sectional view taken on the line 6—6 of Fig. 5.

Similar numerals of reference indicate corresponding parts in all of the figures of the drawings.

The improved cushion tire forming the subject matter of the present invention may be be used in connection with carriages, bicycles, automobiles and similar vehicle wheels and by way of illustration is shown in connection with a vehicle wheel of the ordinary construction in which 5 designates the felly and 6 the spokes.

The tire consists of a metallic rim or band 7 preferably of the same width as the felly of the wheel and having its adjacent ends inclined or beveled, at 8.

Secured to one end of the rim or band 7 are metal strips 9, the free ends of which are spaced apart and bent upon themselves to form transversely alined loops 10, there being a similar strip 11 secured to the opposite end of the rim and bent to form a correspondingly shaped loop 12.

The loops 10 are designed to receive a wedge shaped key 13 so that by forcing the wedge to its seat in the loops the adjacent ends of the rim may be drawn together thereby to firmly clamp the rim in position on the felly.

Secured to the rim or band 7 are a plurality of yieldable members each preferably formed of a single piece of wire bent to form a series of spring coils 14 and 15 disposed one within the other and having their lower ends provided with terminal attaching fingers 16.

The upper convolutions of the outer coils 14 are preferably bent into rectangular shape, at 17, while the wire forming said outer coils is extended downwardly at the center of the square heads 17 to produce inner convolutions or coils 15.

The rectangular terminals or heads 17 of the outer convolutions may be soldered or otherwise rigidly secured together so as to form a continuous bearing surface or if desired said heads may be connected by suitable links so as to permit any particular portion of the tread surface of the tire to yield when striking a rock or other obstruction.

As a means for retaining the yieldable members or coils in position on the rim or band 7 the latter is formed with a plurality of spaced longitudinal slits 18, the metal at said slits being pressed upwardly to form loops or eyes 18 adapted to receive the lower convolutions or attaching fingers 16 of the coils 14 and 15, as best shown in Figs. 2 and 6 of the drawings.

The rim 7 is preferably formed with oppositely disposed flanges 7' which not only serve to reinforce and strengthen the rim but also serve to assist in preventing accidental displacement of the coiled springs.

The felly 5 is preferably cut away at 19 to form a seat for the adjacent ends of the wheel rim or band 7 so that the upper surface of said band will lie flush with the outer face of the felly.

From the foregoing description it will be seen that there is provided an extremely simple, inexpensive and efficient device admirably adapted for the attainment of the ends in view.

Having thus described the invention what is claimed is:

1. A tire for vehicle wheels including a rim adapted to engage the felly of a wheel, yieldable members secured to the rim and each formed of a plurality of integral spring coils of substantially the same height and arranged one within the other, the outer coil of each yieldable member being bent to produce a substantially rectangular head forming a yieldable tread surface, and means for clamping the rim in position on the felly.

2. A tire for vehicle wheels including a rim adapted to engage the felly of a wheel, yieldable members secured to the rim and each formed of a single length of wire bent upon itself to produce a pair of spring coils arranged one within the other, the outer coils of each yieldable member being substantially rectangular in shape and united to the rectangular portion of the outer coil of an adjacent yieldable member.

3. A spring for cushion tires formed of a single piece of wire bent to produce a vertically disposed spring coil the upper convolution of which is substantially rectangular in shape, the wire at the rectangular convolution being bent upon itself and extended downwardly within the outer coil and spaced from the walls thereof to form an inner coil of substantially the same height as the outer coil, said coils being each provided with a terminal attaching member.

In testimony that I claim the foregoing as my own, I have hereto affixed my signature in the presence of two witnesses.

GILBERT O. MAULSBY.

Witnesses:
  H. T. BRACKEN,
  C. S. CHENAULT.